United States Patent [19]

Bittihn et al.

[11] 4,439,502
[45] Mar. 27, 1984

[54] GALVANIC ELEMENT HAVING A POROUS SOLID-ELECTROLYTE SINTER FRAMEWORK CONTAINING THE CATHODE MATERIAL

[75] Inventors: Rainer Bittihn; Eren Yalcin, both of Kelkheim, Fed. Rep. of Germany

[73] Assignee: Varta Batterie Aktiengesellschaft, Hanover, Fed. Rep. of Germany

[21] Appl. No.: 357,408

[22] Filed: Mar. 12, 1982

[30] Foreign Application Priority Data

Jul. 28, 1981 [DE] Fed. Rep. of Germany ....... 3129679

[51] Int. Cl.$^3$ ............................................. H01M 4/36
[52] U.S. Cl. .................................... 429/104; 429/193
[58] Field of Search .......................... 429/104, 191, 193

[56] References Cited

U.S. PATENT DOCUMENTS

| | | | |
|---|---|---|---|
| 3,443,997 | 5/1969 | Argue et al. | 429/191 |
| 3,476,605 | 11/1969 | Owens | 429/191 |
| 3,558,357 | 1/1971 | Tokahoshi | 429/191 |
| 3,647,549 | 3/1972 | Christie et al. | 429/191 X |
| 4,219,613 | 8/1980 | Anand et al. | 429/104 |
| 4,226,921 | 10/1980 | Tsang | 429/104 |
| 4,230,778 | 10/1980 | von Benda et al. | 429/104 |
| 4,302,518 | 11/1981 | Goodenough et al. | 429/104 |
| 4,357,399 | 11/1982 | Auborn et al. | 429/191 X |
| 4,362,793 | 12/1982 | Bittihn et al. | 429/191 |

*Primary Examiner*—Charles F. LeFevour
*Attorney, Agent, or Firm*—Weiser, Stapler & Kimmelman

[57] ABSTRACT

In a galvanic solid cell, for example of the Na/SbCl$_3$ systems, the cathode space is occupied by a self-supporting porous sinter framework of solid electrolyte material, in whose pores the active cathode material is retained. A porous structure can be united with the massive solid electrolyte-separator into a unitary sinter composite of high ion conductivity, to which, if desired, there can also be joined on the anode side a porous sinter framework for receiving the alkali metal. The meltable active electrode materials are introduced by immersion into the porous portions of the sinter composite. The porous solid electrolyte structure can also be used advantageously as the separator system for cells with molten liquid electrodes, e.g. of the Na/S high temperature cell type.

11 Claims, 3 Drawing Figures

GALVANIC ELEMENT HAVING A POROUS SOLID-ELECTROLYTE SINTER FRAMEWORK CONTAINING THE CATHODE MATERIAL

The invention relates to a galvanic element with solid electrolyte, negative alkali metal electrode, and positive electrode.

The field of application of the invention extends not only to true solid cells, in which all of the active components participating in the current delivery are present in solid form, but also to elements of the Na/S-cell type, whose electrodes are liquid during operation.

In contrast to conventional cells with liquid electrolyte and porous solid electrodes, the first-mentioned solid cells in particular have the drawback that the solid electrolyte and cathode body can interact only via their geometrical contact surface, this contact being insufficient for the electro-chemical transformation during relatively intense current loading. However, for sodium/sulfur cells, too, in which a dense ceramic material such as Na-$\beta$-alumina acting as separator keeps the two liquid reaction partners apart, there exists the just mentioned disadvantage, at least for the sulfur side. Whereas the ceramic is transparent to the sodium, due to its sodium ion conducting properties, it acts as a barrier against the much larger sulfur atoms, with the result that the current-producing reaction can occur only at the boundary surface between solid electrolyte separator/cathode, and thereby is limited to the geometrical surface of the solid.

For liquid cells, on the other hand, the electrolyte permeates the hollow spaces of the appropriately prepared electrode material and thereby additionally involves a substantial portion of the inner electrode surface in the current production, to the extent that it does not consist of closed pores. The mass utilization is therefore raised to an optimum level.

For that reason, it has already been attempted, using liquid cells as a model, to transfer to solid cells the penetration of the porous electrode material by the electrolyte, by trying to achieve intimate linking of electrolyte and electrode through admixing of solid electrolyte powder with the cathode material.

However, this technique was not capable of giving complete satisfaction, because only point contacts were produced between the individual particles, and this was detrimental to high load capacity. Also the prerequisite was not always met that the electrolyte and the electrode material, in finest grained subdivision, should not react chemically with each other, i.e. should be compatible with each other.

Another way to arrive at an electrolyte-penetrable solid electrode through preparation of a sponge-like structured electrode body, into which the electrolyte components were then introduced at higher temperatures in molten liquid state, remained precluded by the high melting temperature of known solid electrolytes.

Accordingly, it is the object of the invention to provide a galvanic element with solid electrolyte, whose electrodes, present in solid or in liquid form, have good thermo-dynamic stability in relation to the solid electrolyte, and are simultaneously capable of high current loading.

This and other objects which will appear are achieved by means of a cell of the initially-mentioned kind, which in accordance with the invention has the distinguishing characteristics mentioned in the characterizing portion of claim 1. That is, this cell is one in which the solid electrolyte forms in at least one electrode a self-supporting porous sinter framework.

This makes it possible to inter-penetrate the active electrode material by means of a self-coherent, open structure of solid electrolyte, and to produce as intensive a contact between the current productive components as is required by high mass utilization and good conductivity cross-section for high current loading capability.

In a preferred embodiment of the solid cell of the invention, at least the positive electrode is provided with a solid electrolyte sinter framework.

A particularly preferred solid cell according to the invention is so constructed that the porous sinter framework, which is based for example upon a mixed crystal formed from the components of the quaternary system $Na_2O$—$ZrO_2$—$SiO_2$—$P_2O_5$, has homogeneously sintered onto itself a non-porous material of the same composition and which constitutes the solid electrolyte separator. In that case, there exists a composite portion, which makes it desirably possible to eliminate the separate preparation of the solid electrolyte separator and the electrode framework, because the subsequent pressing together of the individual parts would again create only point contacts, with inadequate current conductivity.

However, as the solid electrolyte in the solid cell embodying the invention, there can also be used $Li_2O.11\ Al_2O_3$ (Li-$\beta$-alumina), $Na_2O.11\ Al_2O_3$ (Na-$\beta$-alumina), or $Li_3N$.

To produce the porous solid electrolyte framework, there are mixed in accordance with the invention 40 parts by volume of fine grained solid electrolyte material with 60 parts by volume of finely ground filler material of carbon base, and these are then compressed. As the filler materials there are suitable for example graphite, charcoal, sawdust, or edible flour, the latter being preferred because of the particularly desirable small pore size and pore distribution which can be achieved thereby.

By sintering the pressed body at 1250° C. for about 3 hours in an open atmosphere, in case of the above-mentioned quaternary system $Na_2O$—$ZrO_2$—$SiO_2$—$P_2O_5$, a porous solid electrolyte body of stable shape is obtained after the filler material has already escaped at lower temperatures as gaseous $CO_2$.

In a preferred procedure, the porous framework is joined to the massive solid electrolyte, which forms within the cell what can be called the "solid electrolyte separator", in a unitary composite portion. To that end, two layers, one of pure solid electrolyte material and the other of solid electrolyte-filler mixture, are carefully poured on top of each other, compressed, and sintered. However, in that case it should be noted that differential sinter shrinkage of the individual components can occur. The filler-containing portion may also shrink during the sintering—due to the escape of the carbon compound—more strongly than the massive separator body. In accordance with the invention, this tendency can be counter-acted by appropriately slowly varying the temperature during the heating and cooling phase of the sinter process, with the result that the sintering has essentially already taken place while the carbon compound is still present, and therefore evaporates only during the high-temperature portion of the final sintering. In this manner, composite bodies are obtained whose component structures are sintered together in intimate contact with each other, and do not exhibit any phase transition between them.

The composite body which has just been described can also be modified, in accordance with the invention, by sintering a porous solid electrolyte framework onto both sides of the massive solid electrolyte separator. This is accomplished by making an appropriate three-layer pressed body, whose middle layer is formed of the pure, i.e. filler-free solid electrolyte material. In this manner, there can be obtained a nearly complete cell structure, with a preformed cathode and anode space, which need only be filled with the appropriate active materials.

The densitometric density $\rho_p$ of a porous sinter framework embodying the invention has about 40% of the theoretical density $\rho_t$ of the material itself. This corresponds to a porosity P of about 60%. The porosity is here defined by the equation $$P[\%] = 100(1 - (\rho_p/\rho_t)).$$

The characteristic small pore diameter (d<20 mm) which characterizes the sinter framework embodying the invention is advantageous because small pores permit enhanced mass utilization compared with large volume pores, due to the overall proximity of the electrolyte, where the reaction solely takes place. On the other hand, wide spacing from the electrolyte would give rise to a large ohmic component in the polarization of the solid cell, so that the mass utilization above a predetermined limiting voltage can be very low.

The good mechanical stability of the sinter framework according to the invention is appropriate for the manipulations of the solid electrolyte bodies which are necessary during introduction of the active electrode material.

This introduction takes place through soaking with meltable compounds of the series $SbCl_3$, $SbBr_3$, $SbI_3$, $PbI_2$ for the cathode, or the alkali metals Li and Na for the anode. In so doing, it is important that the pores of the framework be well wetted by the active material, and further that the vapor pressure of the active cathode materials does not reach values at which there is danger of attack upon the alkali metal electrode, resulting in a discharge of the cell via the gaseous phase.

For Na/S-batteries the framework pores fill-up automatically with liquid sulfur, or liquid sulfur-sodium sulfide, during heating to operating temperature.

Depending upon differences in the compatibility of the alkali metals with those solid electrolyte materials which can be considered in accordance with the invention, it may become necessary to use a different solid electrolyte material for the portion of the separator which is immediately adjacent to the alkali metal than for the porous framework. Thus, when using a Li electrode, for example, the combination of the $Li_3N$ as electrolyte separator in a sinter composite with Li-$\beta$-alumina is desirable. When using a Na electrode, the above-mentioned 4-component mixed crystal or Na-$\beta$-alumina are preferred, either individually or in a mixed sinter composite.

For further details, reference is made to the discussion which follows in light of the accompanying drawings wherein.

Figure 1:
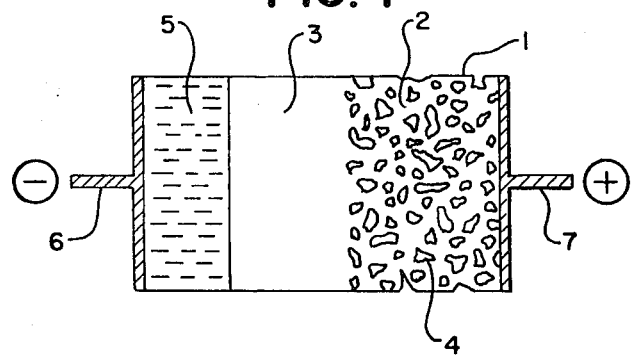
FIG. 1 shows a galvanic solid cell according to the invention.

According to FIG. 1, there are united in the solid cell 1, as a unitary sinter composite, the porous solid electrolyte framework 2 defining the cathode space, and the non-porous solid electrolyte separator 3. The framework pores 4 are filled with meltable active cathode materials, e.g. $SbCl_3$, whereas the negative metal anode 5, e.g. Na, is molten onto the massive separator 3. The device is contacted at its ends by the two current take-off conductors 6, 7.

Figure 2:
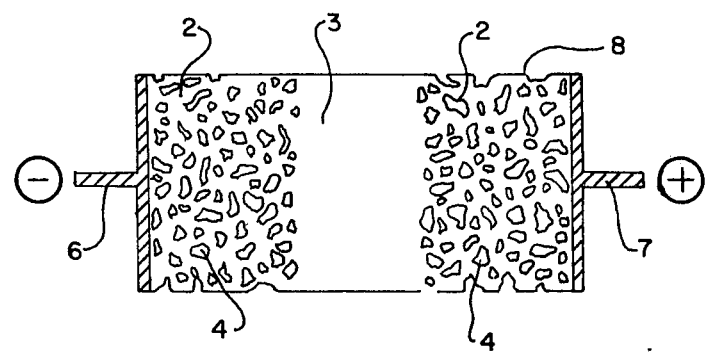
FIG. 2 shows a modified galvanic solid cell according to the invention.

According to FIG. 2, the three-layer sinter composite is also present in the anode region with a porous framework structure 2, the pores 4 on that side containing the alkali metal. This complete cell structure consists of a single shaped body, the advantage of such an arrangement being evident. Moreover, the cells which are illustrated here operate in reversible manner.

Figure 3:
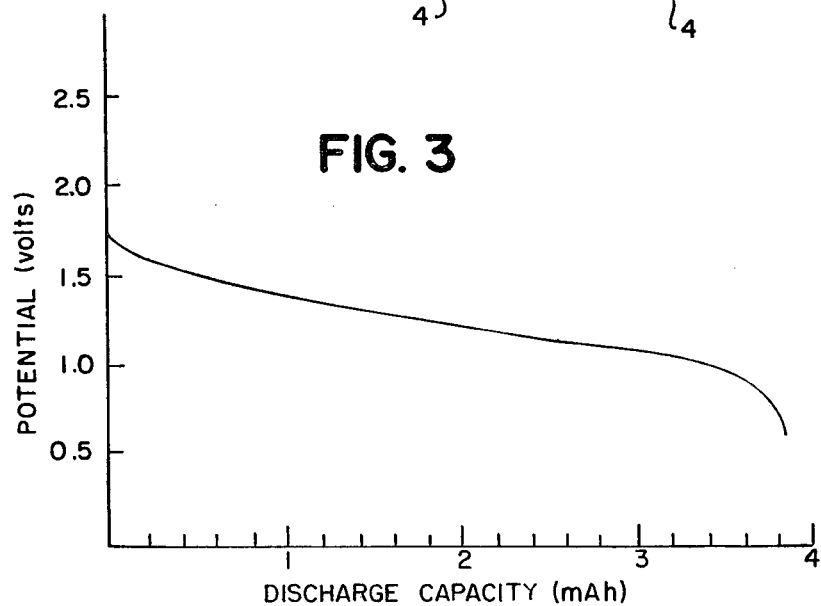
FIG. 3 shows the discharge curve of a $Na/SbCl_3$ cell according to the invention.

Discharge according to FIG. 3 was carried out by means of a $Na/SbCl_3$ cell, which was based on a sinter composite according to FIG. 1, of a mixed crystal material $Na_{3.1} Zr_{1.55} Si_{2.3} P_{0.7}O_{11}$, with a porosity of 60% in its cathode segment. The discharge resistance was 100 k$\Omega$. It is also noted that $SbCl_3$ in a cell without any $Na^+$-conductive framework would not be dischargeable at all, and that even a solid electrolyte material which is mixed into a cathode material in powdery form does not enable discharge, if it is not sintered into framework configuration in accordance with the invention.

Attention is further invited to an interesting application of the principle which resides in the solid electrolyte sinter composite embodying the present invention. That is, it makes it possible to precisely measure the ion conductivity of a porous body, when the latter constitutes the central segment in a sinter body of the type illustrated in FIG. 2, i.e. when an inverse, massive-porous-massive sequence is present between the current take-off conductors. With such a measuring cell (diaphragm cell), there is obtained a predetermined contact with the measuring electrodes, which was not capable of being provided in prior practice. The dimensions of such a measuring cell, which are also those of solid cells embodying the invention, are in the range of a few millimeters.

The above-mentioned measuring cell is suitable both for DC and AC current measuring methods. To determine the conductivity of the porous segment, it is merely necessary to substract from the measured total resistance the separately calculated resistance values of the massive portions. From an impedance spectrum for the porous mixed crystal material, one can deduce, for a porosity P=60%, a $Na^+$-ion conductivity $\sigma = 10^{-4} \Omega^{-1}$ cm$^{-1}$.

This high conductivity of porous solid electrolytes embodying the invention, wherein $\sigma_p : \sigma_{massive} \approx 1:10$, as well as their high degree of porosity, create desirable preconditions for the incorporation of active electrolyte materials.

We claim:

1. A galvanic element with solid electrolyte, a negative alkali metal electrode and positive electrode, wherein
   the solid electrolyte forms a self-supporting porous sinter framework in at least one electrode.

2. The galvanic element of claim 1, wherein an electrode which contains the solid electrolyte framework is the positive electrode.

3. The galvanic element of claim 1, wherein the solid electrolyte framework of the electrode is homogeneously sintered to a non-porous solid electrolyte material constituting the separator.

4. The galvanic element of claim 1, wherein the solid electrolyte material is a mixed crystal, of the components of the quaternary system $Na_2O-ZrO_2-SiO_2-P_2O_5$.

5. The galvanic element of claim 1, wherein the solid electrolyte material is selected from the group of $Li_2O.11\ Al_2O_3$ (Li-$\beta$-alumina), $Na_2O.11\ Al_2O_3$ (Na-$\beta$-alumina), and $Li_3N$.

6. The galvanic element of claim 1, wherein the negative electrode is a Li or Na electrode.

7. The galvanic element of claim 1, wherein the active material of the positive electrode is a meltable compound selected from the group of $SbCl_3$, $SbBr_3$, $SbI_3$, and $PbI_2$.

8. The galvanic element of claim 1, wherein the active material of the positive electrode is sulfur.

9. In a galvanic element having a solid electrolyte, an alkali metal cathode and an anode, the improvement which comprises, said solid electrolyte forming a self-supporting porous sinter framework in whose pores anode material is disposed so as to constitute said anode, and said framework constituting said anode being joined to non-porous solid electrolyte material which constitutes a separator.

10. The galvanic element of claim 9 including a self-supporting porous sinter framework in whose pores cathode material is retained and which is joined to said separator and constitutes the cathode.

11. The galvanic element of claim 10 wherein said solid electrolyte material is a mixed crystal of the components of the quaternary system $Na_2O-ZrO_2-SiO_2-P_2O_5$.

* * * * *